Jan. 11, 1949. T. B. CHACE 2,458,978
FLUID CONTROL SYSTEM AND MECHANISM
Filed April 24, 1944
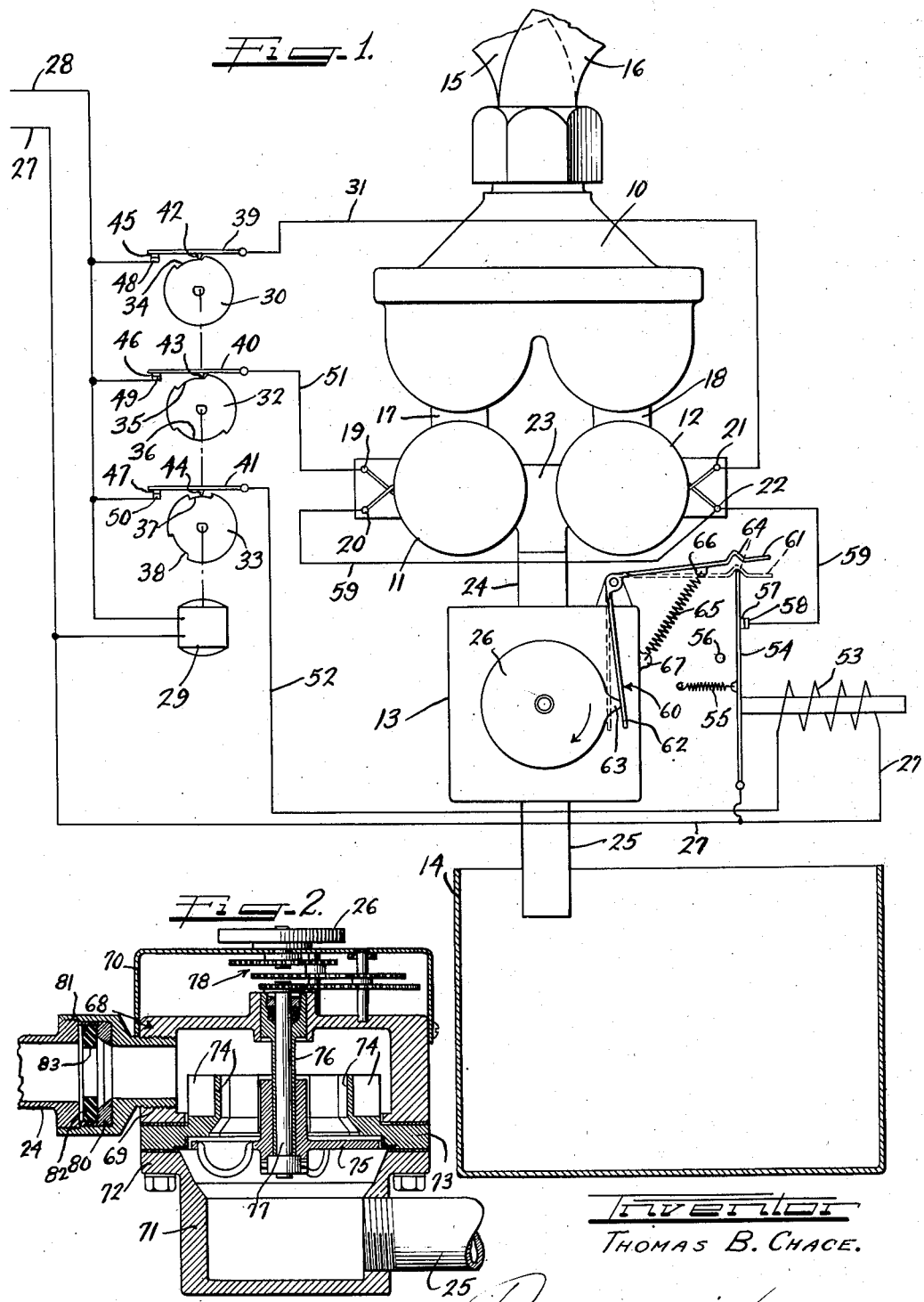
Inventor
Thomas B. Chace.

Patented Jan. 11, 1949

2,458,978

UNITED STATES PATENT OFFICE 2,458,978

FLUID CONTROL SYSTEM AND MECHANISM

Thomas B. Chace, Winnetka, Ill., assignor to The Dole Valve Company, Chicago, Ill., a corporation of Illinois Application April 24, 1944, Serial No. 532,467

5 Claims. (Cl. 222—76)

This invention relates to a fluid control system and mechanism and more particularly to a fluid control and delivery system in which means is provided for delivering a predetermined quantity of fluid at different times in a sequential cycle of operation.

In fluid supply systems such, for example, as the fluid supply system of an automatic washing machine, it is desirable to deliver water of predetermined temperatures and in predetermined amounts at different points in a cycle of operation Such systems usually comprise means for controlling and determining the temperature of the water which is delivered and in addition some means must be provided for limiting or determining the amount of water which is delivered to the tub of the automatic washing machine. One type of control which has been provided in the past is to employ floats which will automatically shut off the water supply when the water has reached a predetermined height in the tub of the washing machine. Another type of control has been provided in the past which causes a uniform rate of fluid delivery irrespective of variations in pressure of the fluid supply line, and controls the length of time which the inlet valves are held open. To put this in a somewhat different manner, means have been provided in the past which cause water to be delivered at a uniform rate for a predetermined period of time at different points in a cycle of operation. The objection to this type of system is that the time it takes to fill the tub is relatively long, since the rate must be made low enough to take into account possible low pressure conditions in the fluid supply line.

One of the principal features and objects of the present invention is to provide a fluid control system and mechanism in which means is provided for metering the fluid delivered and for shutting off the inlet valve when a predetermined metered quantity of fluid has been delivered. This enables fluid to be delivered at the maximum rate available for different pressure conditions throughout a wide range.

A further object of the present invention is to provide a novel fluid control system including means for supplying water at different predetermined temperatures at different stages in a cycle of operation and for metering the water delivered. Another object of the present invention is to provide a novel control system in which a timer controls the opening of the inlet valves of the fluid system but in which a metering device effects the closure of the inlet valve.

Another and still further object of the present invention is to provide a novel metering device and relay control for a fluid supply system.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawing, in which:

Figure 1 is a diagrammatic illustration of a fluid control system embodying the novel features and teachings of the present invention; and Figure 2 is a sectional view of one form of metering device which may be employed in the fluid control system shown in Figure 1.

Referring first to Figure 1 of the drawing, there is illustrated therein a fluid control system including a dual mixer valve 10, a pair of electrically operated inlet valves 11 and 12, a metering device 13 and a tub 14.

The dual mixer valve 10 may be of any suitable design for mixing hot and cold water supplied from the hot and cold water supply ducts 15 and 16 and which will deliver a mixed fluid at one temperature through the duct 17 and at a second temperature through the duct 18. By way of illustration and not by way of limitation the dual mixer valve may be of the type described and claimed in my copending application for patent entitled "Fluid control system," U. S. Serial No. 513,610, filed December 9, 1943, and assigned to the same assignee as the present invention.

The electrically operated valves 11 and 12 are interposed in the conduits 17 and 18 and are arranged to control the flow therefrom. More particularly, the valve 11 is arranged to prevent delivery of water from the conduit 17 when deenergized and is arranged to permit full delivery of water from the conduit 17 when energized through a circuit presently to be described, and connected to the terminals 19 and 20. Similarly, the electrically operated valve 12 is arranged to close off the conduit 18 when deenergized and is arranged to permit unrestricted delivery of water from the conduit 18 when energized through a control circuit connected to the terminals 21 and 22.

The downstream sides of the two valves 11 and 12 are connected together through a T-connection 23 as shown. The leg of the T-connection merges into a fluid duct 24 passing to the metering device 13. After the fluid leaves the metering device 13 it passes through a conduit 25 and is discharged into the tub 14.

The metering device 13, in substance, includes a water wheel which drives a cam 26 through suitable reduction gearing. The gearing is preferably connected in such a manner that the cam disk 26 makes one complete revolution upon the passage of the desired metered quantity of water. In the illustrated embodiment of the invention this desired metered quantity of water would be the required amount of water to bring the liquid level in the tub 14 up to the desired point.

The electrically operated valves 11 and 12 are arranged to be energized from a pair of power supply conductors 27 and 28 which are connected to a suitable source of electric energy (not shown). This energization circuit for each of the electrically operated valves 11 and 12 will now be described.

As diagrammatically illustrated in Figure 1 of the drawing a timer motor 29 is provided which drives three cam disks 30, 32 and 33 in a clockwise direction. The cam disk 30 is provided with a cutout peripheral portion 34 while the cam disks 32 and 33 are each provided with a pair of cutout portions 35 and 36, and 37 and 38, respectively.

Movable contact arms 39, 40 and 41 are associated respectively with the cam disks 30, 32 and 33. The contact arms 39 to 41 are provided with cam followers 42 to 44 respectively which ride on the outer peripheral surface of the cam disks 30, 32 and 33. The movable contact arms 39 to 41 are provided with contacts 45 to 47 which are arranged to close against stationary contacts 48 to 50 respectively. These stationary contacts 48, 49 and 50 are connected to the power supply conductor 28. The movable contact arm 39 is connected through a conductor 31 to the terminal 21 of the electrically operated valve 12. The movable contact arm 40 is connected through a conductor 51 to the terminal 19 of the electrically operated valve 11. The movable contact arm 41 is connected through a conductor 52 to one end of a relay coil 53, the opposite end of the relay coil being connected to the power supply conductor 27.

The relay coil 53, when energized, is arranged to move a movable contact arm 54 of a relay switch against the action of its associated biasing spring 55. The biasing spring 55 normally urges the movable contact arm 54 against a stationary abutment or stop 56. This movable contact arm 54 is directly connected to the power supply conductor 27. The movable contact arm 54 includes a contact 57 which is arranged to close against the stationary contact 58 that is connected through a conductor 59 to the terminal 22 of the electrically operated valve 12 as well as to the terminal 20 of the electrically operated valve 11.

It will be apparent, from the above description, that the electrically operated valve 12 is energized (and hence, open) whenever both switch operated by contact arm 39 and switch operated by contact arm 54 are closed. Similarly, the electrically operated valve 11 is energized (and hence, open) whenever the switch operated by contact arm 40 and the switch operated by contact arm 54 are both closed. The relay coil 53 is energized whenever the switch operated by contact arm 41 is closed.

For a reason which will presently be apparent, means is provided for holding the switch 54 closed under certain circumstances even when the relay coil 53 is deenergized. This means includes a bell crank arm 60 having two leg portions 61 and 62. The leg portion 62 is arranged to engage the outer peripheral surface of the cam 26 including the raised portion 63 thereof. The leg portion 61 is in the form of a latch having a generally V-shaped indent 64 therein which fits over the end of the switch arm 54. A spring 65 extending between an ear 66 on the arm 61, and an ear 67 on the housing of the metering device 13, normally urges the arm 61 toward the contact arm 54. If the contact arm has first been moved to its closed position and the latching arm 61 thereafter moved against the ends thereof, the latching portion 64 will hold the contact arm 54 in its closed position irrespective of subsequent deenergization of the relay coil 53. Upon subsequent movement of the arm 61 from the dotted line position as shown in Figure 1 to its full line position as shown in Figure 2, the contact arm 54 is released and the spring 55 will move it to its open position.

The cycling mechanism represented by the timer motor 29 and its associated cam disks 30, 32 and 33, is such that the relay coil 53 is energized slightly ahead of the time when the contact arms 39 and 40 are moved closed. This, however, is merely a preferred form of the invention since it is apparent that the starting of the metering device will be occasioned upon the closure of either or both of the contact arms 39 and 40 along with the contact arm 54.

The operation of the control circuit will now be described. With the cams 30, 32 and 33 in the position as shown in Figure 1 of the drawing, the relay coil 53 is energized, since the cam follower 44 on the contact arm 41 has fallen into the cutout portion 37 of the cam disk 33. This has already occurred a short interval of time prior to the position as shown in Figure 1 of the drawing due to the fact that the cutout portion 37 extends slightly to the right of the cam follower 44. The cam followers 42 and 43 have just fallen down into the cutaway portions 34 and 35 of the cam disks 30 and 32 which has caused closure of the switch arms 39 and 40. This effects energization of both the electrically operated valves 11 and 12. The electrically operated valve 12 is energized from the power supply conductor 28 through the switch 39, conductor 31, the electrically operated valve 12, conductor 59, contacts 57—58, switch arm 54 and back to power supply conductor 27. The electrically operated valve 11 is energized from the power supply conductor 28 through switch 40, conductor 51, the electrically operated valve 11, conductor 59, contacts 57—58, switch arm 54 and thence back to the power supply conductor 27. Upon energization of the valves 11 and 12 water starts to flow from both conduits 17 and 18, through valves 11 and 12 respectively, and is then mixed together in the T-connection 23.

This mixture flows through the conduit 24 into the metering device 13 and then on through the delivery conduit 25 into the tub 14. As water flows through the metering device 13 the cam disk 26 starts to rotate in a clockwise direction as indicated by the arrow. After the raised portion 63 on the cam 26 passes the end of the arm 62 the spring 65 moves the arm 61 into its latching position against the contact arm 54. This holds the contact arm 54 in its closed position irrespective of subsequent deenergization of the relay 53. The relay 53 is deenergized as soon as the cam follower 44 rides up on to the high point on the cam disk 33 which follows the cutout portion 37.

It is understood that the cutaway portions 34 and 35 on the cam disks 30 and 32 are of such extent that the switches operated by arms 39 and 40 respectively will not be opened prior to one complete revolution of the cam disk 26 which is driven by the metering device 13. After a sufficient quantity of water has flowed through the metering device 13 so as to effect one complete revolution of the cam disk 26 the raised portion 63 will cause a counter-clockwise rocking movement of the bell crank lever 60. This frees the latching engagement of the arm 61 from the contact arm 54 and the latter is immediately moved to its open position against the stop 56 by the spring 55. It will thus be apparent that fluctuation in the pressure of the fluid passing through the fluid mixing valve 10 does not in any way effect the measured quantity of water which is delivered to the tub 14 for the timer 29 and its associated cams 30, 32 and 33 do not govern or control the times when the valves 11 and 12 are closed. These are rather closed by the action of the metering device which determines the time at which the switch arm 54 is moved open.

The manner in which the water is drained from the tub 14 forms no part of the present invention and accordingly is not shown. It will be understood, however, that after the water in the tub 14 has been used, it will thereafter be drained, and this may be under the control of the timer 29.

For purposes of illustration, the cam disks 30, 32 and 33 are shown as being arranged to deliver water at a different temperature at a subsequent stage in the cycle of operation. More particularly, the cam disk 32 is provided with a second cutaway portion 36 while the cam disk 30 has no second cutaway portion. It will thus be seen that at a subsequent stage in the cycle of operation the switch arm 40 is moved closed although the switch arm 39 remains in the open position. This effects energization of the electrically operated valve 11 only. The operation of the circuit when this valve 11 only is energized is similar to that previously described. More particularly, the cam disk 33 is provided with a second cutaway portion 38 which is associated with the cutaway portion 36 of the cam disk 32 to effect energization of the relay 53 just prior to the time when the switch arm 40 is moved to the closed position. The deenergization of the electrically operated valve 11 is effected in the same manner by the rotation of the cam disk 26 on the metering device 13.

In Figure 2 of the drawing I have illustrated a form of structure for the metering device 13 which has been found to be satisfactory in operation. The metering device shown therein includes a housing 68 comprising an intermediate housing member 69, an upper housing member 70 and a lower housing member 71. Mounted in the intermediate housing member 69 and clamped between the flange 72 of the lower housing member 71 and the intermediate housing member 69 is a member 73 having a plurality of guide vanes 74 therein. An impeller 75 of the reaction turbine type having a plurality of depressed cup-shaped blades is journalled on a hollow post 76 and keyed to a shaft 77 at its lower end. The shaft 77 extends up through the hollow post or bearing member 76. Reduction gearing generally indicated by the reference character 78 is provided in the upper housing member 70 and this reduction gearing is driven by the shaft 77 of the rotor 75. A driven shaft 79 extends out through the wall of the housing member 70 and the cam disk 26 is mounted on the outer end thereof. It will thus be apparent that as water flows from the conduit 24 into the housing 69 between the guide vanes 74 and down through the impeller blades 84, and thence out through the conduit 25, the shaft 77 is rotated. The speed of rotation of the shaft 77 depends upon the velocity of the fluid passing through the turbine and hence upon the quantity of water passing therethrough.

In order to safeguard the mechanism against extremely high pressures it has been found, on some occasions, to be desirable to provide some means for restricting flow when the inlet pressure is extremely high. To this end a seat member 80 is mounted in the inlet nipple 81 of the housing member 69. A resilient annular member 82 having a relatively large central opening 83 is seated on the seat member 80. This opening 83 is so large that under normal water pressures there is substantially no deformation of the resilient member 82. However, under extremely high pressures, this member will be flexed to cause a reduction in the size of the orifice 83 on the upstream side. This, in turn, will cut down the rate at which fluid is delivered and will thus prevent an overflowing in the tub 14 due to the time lag involved in operating the shutoff valves 11 and 12.

While the illustrated embodiment of the invention has been shown with electrically operated shutoff valves 11 and 12 as well as other electrical control and latching mechanisms, it will, of course, be appreciated that the broad novel features of the present invention include equipment in which mechanical equivalents are employed.

While I have shown a particular embodiment of my invention, it will, of course, be understood that I do not wish to be limited thereto, since many other modifications may be made and I therefore contemplate by the appended claims to cover all such modifications as fall within the true spirit and scope of my invention.

I claim as my invention:

1. A fluid control system comprising a fluid supply duct, an electrically operated shutoff valve in said supply duct, an energizing circuit for opening said valve including a cam operated switch and a relay operated switch connected in series with said valve, an energizing circuit for said relay including a second cam operated switch for closing the energization circuit for said relay, a fluid metering device in said duct for measuring the quantity of water flowing therethrough, a continuously running substantially constant speed timer, cam means operated by said timer for closing both of said cam operated switches, and means operated solely by said metering device independently of said timer for opening said relay operated switch after a predetermined quantity of fluid has passed through said metering device.

2. A fluid control system comprising a fluid supply duct, an electrically operated shutoff valve in said supply duct, an energizing circuit for opening said valve including a cam operated switch and a relay operated switch connected in series with said valve, an energizing circuit for said relay including a second cam operated switch for closing the energization circuit of said relay, a fluid metering device in said duct for measuring the quantity of water flowing therethrough, a timer, cam means operated by said timer for closing both of said cam operated switches and for opening said relay cam operated switch a relatively short time after it has been closed, latch means engageable with said relay operated switch for holding the same in a closed position after it has been closed by said relay, and cam means operated by said metering device independently of said timer for releasing said latch means after a predetermined quantity of fluid has passed through said metering device.

3. A fluid control system comprising a fluid supply duct, an electrically operated shutoff valve in said supply duct, an energization circuit for said valve including a first switch and a second switch connected in series with said valve, a timer, means operated by said timer for closing said first switch for a relatively long period of time, a relay for closing said second switch, said relay having an energization circuit including a third switch, means operated by said timer for closing said third switch at least as early as the time when said first switch is closed and for a relatively short period of time, a latch for holding said second switch closed after closure thereof by said relay, a fluid metering device in said supply duct on the downstream side of said shutoff valve, reduction gearing, a cam driven by said metering device through said reduction gearing, said cam being arranged to release said latch and effect closing of said valve after a predetermined quantity of fluid has passed through said metering device.

4. A fluid control system comprising a fluid supply duct, an electrically operated shutoff valve in said supply duct, an energization circuit for said valve including a first switch and a second switch connected in series with said valve, a timer, cam means operated by said timer for closing said first switch and for holding said first switch closed for a relatively long period of time, a relay for closing said second switch, said relay having an energization circuit including a third switch, cam means operated by said timer for closing said third switch at least as soon as said first switch is closed and for a relatively short period of time, a latch for holding said second switch closed after closure thereof by said relay, biasing means for urging said latch to its latching position, a fluid metering device in said supply duct on the downstream side of said shutoff valve, means operated by said metering device for moving said latch from its latching position and effecting closing of said valve after a predetermined quantity of fluid has passed through said metering device.

5. A fluid control system comprising a fluid supply duct, a shutoff valve in said supply duct, an electromagnet coil for operating said valve, a fluid metering device including rotatable vane means for measuring the quantity of fluid flowing through said duct, a rotatable cam coupled to said vane means, a latch operable by said rotatable cam, a switch spring biased in the open position and adapted to be locked in the closed position by said latch when said cam is out of contact with said latch, a switch operating coil for controlling said switch, a timer to effect cycling of fluid supply including a plurality of switches operable at preselected time intervals, one of said plurality of switches being in series with said valve electromagnet coil and said spring biased switch, a second of said plurality of switches being in series with said switch operating coil to effect closing of said spring biased switch to partially prepare a circuit for energizing said shutoff valve electromagnet coil when no fluid is flowing through said duct, said latch being arranged to lock said spring biased switch in the closed position so long as fluid is flowing through said duct and until said cam effects release of said latch to effect transfer of control of said spring biased switch to said second of said plurality of switches.

THOMAS B. CHACE.

REFERENCES CITED

The following references are of record in the file of this patent:

UNITED STATES PATENTS

| Number | Name | Date |
| --- | --- | --- |
| 1,545,938 | Bren | July 14, 1925 |
| 1,985,929 | Jorgensen | Jan. 1, 1935 |
| 2,137,928 | Tanqueray | Nov. 22, 1938 |
| 2,197,294 | Brockbank | Apr. 16, 1940 |
| 2,269,259 | Fields | Jan. 6, 1942 |
| 2,296,266 | Breckenridge | Sept. 22, 1942 |
| 2,334,831 | Meyer et al. | Nov. 23, 1943 |

OTHER REFERENCES

Powers, page 27 of Bulletin No. 258, entitled "Powers Mixing Valves," published April 1940 by the Powers Regulator Co., Chicago, Ill. Copy in 236/12 (36 pages, only front cover and page 27 required).